United States Patent
Sandberg et al.

(10) Patent No.: US 12,476,734 B2
(45) Date of Patent: Nov. 18, 2025

(54) CYCLIC REDUNDANCY CHECK SELECTION

(71) Applicant: Telefonaktiebolaget LM Ericsson (publ), Stockholm (SE)

(72) Inventors: Sara Sandberg, Luleå (SE); Mattias Andersson, Sundbyberg (SE); Yufei Blankenship, Kildeer, IL (US); Amirpasha Shirazinia, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1025 days.

(21) Appl. No.: 16/476,517

(22) PCT Filed: Dec. 22, 2017

(86) PCT No.: PCT/IB2017/058375
§ 371 (c)(1),
(2) Date: May 31, 2022

(87) PCT Pub. No.: WO2018/127768
PCT Pub. Date: Jul. 12, 2018

(65) Prior Publication Data
US 2022/0376820 A1 Nov. 24, 2022

Related U.S. Application Data

(60) Provisional application No. 62/444,331, filed on Jan. 9, 2017.

(51) Int. Cl.
*H04L 1/00* (2006.01)

(52) U.S. Cl.
CPC .......... *H04L 1/0043* (2013.01); *H04L 1/0061* (2013.01); *H04L 1/0067* (2013.01)

(58) Field of Classification Search
CPC ... H04L 1/0043; H04L 1/0061; H04L 1/0067; H04L 1/0057; H04L 1/0041; H03M 13/35; H03M 13/09
See application file for complete search history.

(56) References Cited

U.S. PATENT DOCUMENTS

2011/0214037 A1* 9/2011 Okamura .......... H03M 13/6527
714/E11.032
2016/0299812 A1* 10/2016 Olbrich ............... G06F 12/0246
(Continued)

FOREIGN PATENT DOCUMENTS

| EP | 1931072 A2 | 6/2008 |
|----|-----------|--------|
| WO | 2009156798 A1 | 12/2009 |
| WO | 2018127768 A1 | 7/2018 |

OTHER PUBLICATIONS

Nokia et al., "CRC attachment for eMBB data", 3GPP TSG-RAN WG1 #87, Reno, USA Nov. 14-18, 2016 RI-1612279, 4 pages.
(Continued)

*Primary Examiner* — Luat Phung
(74) *Attorney, Agent, or Firm* — Sage Patent Group

(57) ABSTRACT

A system and method for selecting a number of cyclic redundancy check bits in a communication system. In one embodiment, an apparatus operating in a communication system is configured to receive scheduling information from the communication system, and determine an information block length (K) and/or code rate (R) for a code block including a sequence of data bits from the scheduling information. The apparatus is further configured to determine a number of cyclic redundancy check (CRC) bits as a function of the information block length (K) and/or code rate (R) for the code block.

18 Claims, 9 Drawing Sheets

(56) References Cited

U.S. PATENT DOCUMENTS

2017/0366299 A1* 12/2017 Li .................... H04L 27/2602
2020/0021310 A1* 1/2020 Zheng ................ H03M 13/155

OTHER PUBLICATIONS

Spreadtrum Communications, "Code segmentation and CRC issues for LDPC codes", 3GPP TSG RAN WG1 meeting #86bis, Lisbon, Portugal,. Oct. 10-14, 2016, R1-1608921, 2 pages.
ZTE, "CRC attachment for NR data channel", 3GPP TSG RAN WG1 Meeting #90, Prague, Czechia Aug. 21-25, 2017, R1-1713229, 6 pages.
PCT/IB2017/058375 filed on Dec. 22, 2017, International Search Report dated Apr. 5, 2018, 16 pages.

* cited by examiner

CYCLIC REDUNDANCY CHECK SELECTION

CROSS-REFERENCE TO RELATED APPLICATION

This application is the National Stage of, and therefore claims the benefit of, International Application No. PCT/IB2017/058375 filed on Dec. 22, 2017, entitled "CYCLIC REDUNDANCY CHECK SELECTION" which claims the benefit of U.S. Provisional Application No. 62/444,331 filed on Jan. 9, 2017, entitled "CYCLIC REDUNDANCY CHECK SELECTION". The above-referenced applications are commonly assigned with this National Stage application and is incorporated herein by reference in its entirety.

TECHNICAL FIELD

The present invention is directed, in general, to the communication systems and, more specifically, to a system and method for selecting a number of cyclic redundancy check bits in a communication system.

BACKGROUND

In communication systems, the low-density parity-check ("LDPC") codes are often combined with a cyclic redundancy check ("CRC") code to improve the error detection capability. When the number of CRC bits is high when combined with LDPC codes, this may cause the transmission of unnecessary bits and reduces the throughput of the communication system. Accordingly, what is needed in the art is a system and method for selecting a number of CRC bits with LDPC codes in a communication system.

SUMMARY

These and other problems are generally solved or circumvented, and technical advantages are generally achieved, by advantageous embodiments of the present invention for a system and method for selecting a number of cyclic redundancy check bits in a communication system. In one embodiment, an apparatus operating in a communication system is configured to receive scheduling information from the communication system, and determine an information block length (K) and/or code rate (R) for a code block including a sequence of data bits from the scheduling information. The apparatus is further configured to determine a number of cyclic redundancy check ("CRC") bits as a function of the information block length (K) and/or code rate (R) for the code block.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules for selecting a number of cyclic redundancy check bits in a communication system. While the principles will be described in the environment of a Third Generation Partnership Program ("3GPP") Long Term Evolution ("LTE") communication system, any environment such as a Wi-Fi wireless communication system is well within the broad scope of the present disclosure.

Figure 1:
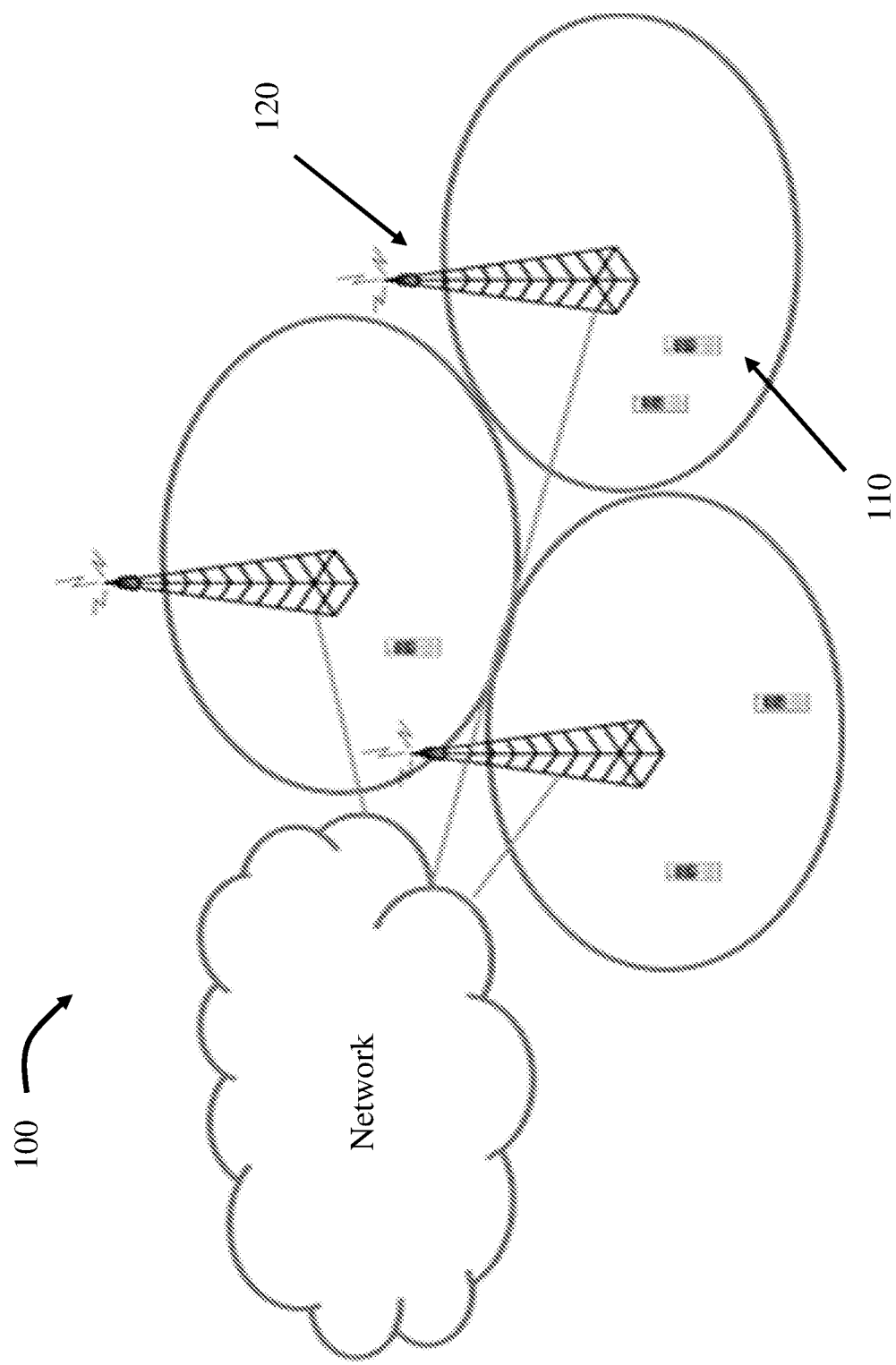
FIGS. 1 to 3 illustrate diagrams of embodiments of a communication system, and portions thereof.
Figure 2:
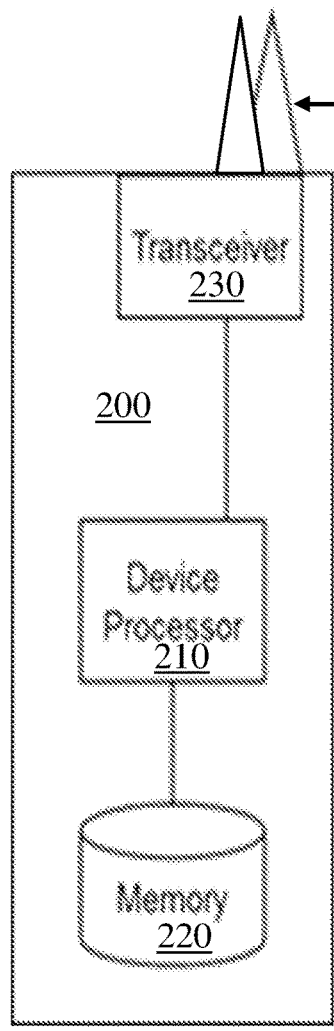
Figure 3:
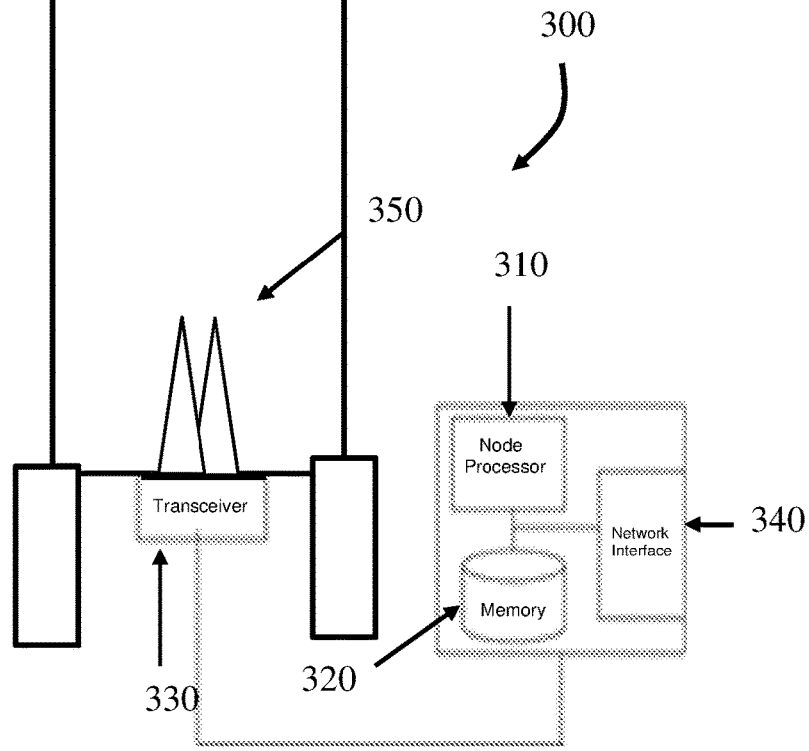

Referring initially to FIGS. 1 to 3, illustrated are diagrams of embodiments of a communication system 100, and portions thereof. As shown in FIG. 1, the communication system 100 includes one or more instances of wireless communication devices (one of which is designated 110, and also referred to as user equipment ("UE")).

The wireless communication device 110 may be any device that has an addressable interface (e.g., an Internet protocol ("IP") address, a Bluetooth identifier ("ID"), a near-field communication ("NFC") ID, etc.), a cell radio network temporary identifier ("C-RNTI"), and/or is intended for accessing services via an access network and configured to communicate over the access network via the addressable interface. For instance, the wireless communication device 110 may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The wireless communication device 110 may be a portable, pocket-storable, hand-held, computer-comprised, or vehicle-mounted mobile device, enabled to communicate voice and/or data, via a wireless or wireline connection. A wireless communication device 110 may have functionality for performing monitoring, controlling, measuring, recording, etc., that can be embedded in and/or controlled/monitored by a central processing unit ("CPU"), microprocessor, ASIC, or the like, and configured for connection to a network such as a local ad-hoc network or the Internet. A wireless communication device 110 may have a passive communication interface, such as a quick response (Q) code, a radio-frequency identification ("RFID") tag, an NFC tag, or the like, or an active communication interface, such as a modem, a transceiver, a transmitter-receiver, or the like.

The communication system 100 also includes one or more radio access nodes (one of which is designated 120) such as eNodeBs, gNBs or other base stations capable of communicating with the wireless communication devices 110 along with any additional elements suitable to support communication between wireless communication devices 110 or between a wireless communication device 110 and another communication device (such as a landline telephone). Although the illustrated wireless communication devices 110 may represent communication devices that include any suitable combination of hardware and/or software, the wireless communication devices 110 may, in particular embodiments, represent devices such as the example wireless communication device 200 illustrated in greater detail by FIG. 2. Similarly, although the illustrated radio access node 120 may represent network nodes that include any suitable combination of hardware and/or software, these nodes may, in particular embodiments, represent devices such as the example radio access node 300 illustrated in greater detail by FIG. 3.

As shown in FIG. 2, the example wireless communication device 200 includes a processor (or processing circuitry) 210, a memory 220, a transceiver 230, and antennas 240. In particular embodiments, some or all of the functionality described above as being provided by machine type communication ("MTC") and machine-to-machine ("M2M") devices, and/or any other types of wireless communication devices may be provided by the device processor executing instructions stored on a computer-readable medium, such as the memory shown in FIG. 2. Alternative embodiments of the wireless communication device 200 may include additional components beyond those shown in FIG. 2 that may be responsible for providing certain aspects of the device's functionality, including any of the functionality described above and/or any functionality necessary to support the solution described herein.

As shown in FIG. 3, the example radio access node 300 includes a processor (or processing circuitry) 310, a memory 320, a transceiver 330, a network interface 340 and antennas 350. In particular embodiments, some or all of the functionality described herein may be provided by a base station, a node B, an enhanced node B, a base station controller, a radio network controller, a relay station and/or any other type of network node may be provided by the node processor executing instructions stored on a computer-readable medium, such as the memory shown in FIG. 3. Alternative embodiments of the radio access node 300 may include additional components responsible for providing additional functionality, including any of the functionality identified above and/or any functionality necessary to support the solution described herein.

The processors, which may be implemented with one or a plurality of processing devices, performs functions associated with its operation including, without limitation, precoding of antenna gain/phase parameters, encoding and decoding of individual bits forming a communication message, formatting of information and overall control of a respective communication device. Exemplary functions related to management of communication resources include, without limitation, hardware installation, traffic management, performance data analysis, configuration management, security, billing and the like. The processors may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The memories may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication device to perform its intended tasks. Of course, the memories may form a data buffer for data transmitted to and from the same. Exemplary embodiments of the system, subsystems, and modules as described herein may be implemented, at least in part, by computer software executable by processors, or by hardware, or by combinations thereof.

The transceivers modulate information onto a carrier waveform for transmission by the respective communication device via the respective antenna(s) to another communication device. The respective transceiver demodulates information received via the antenna(s) for further processing by other communication devices. The transceiver is capable of supporting duplex operation for the respective communication device. The network interface performs similar functions as the transceiver communicating with a core network.

Figure 4:
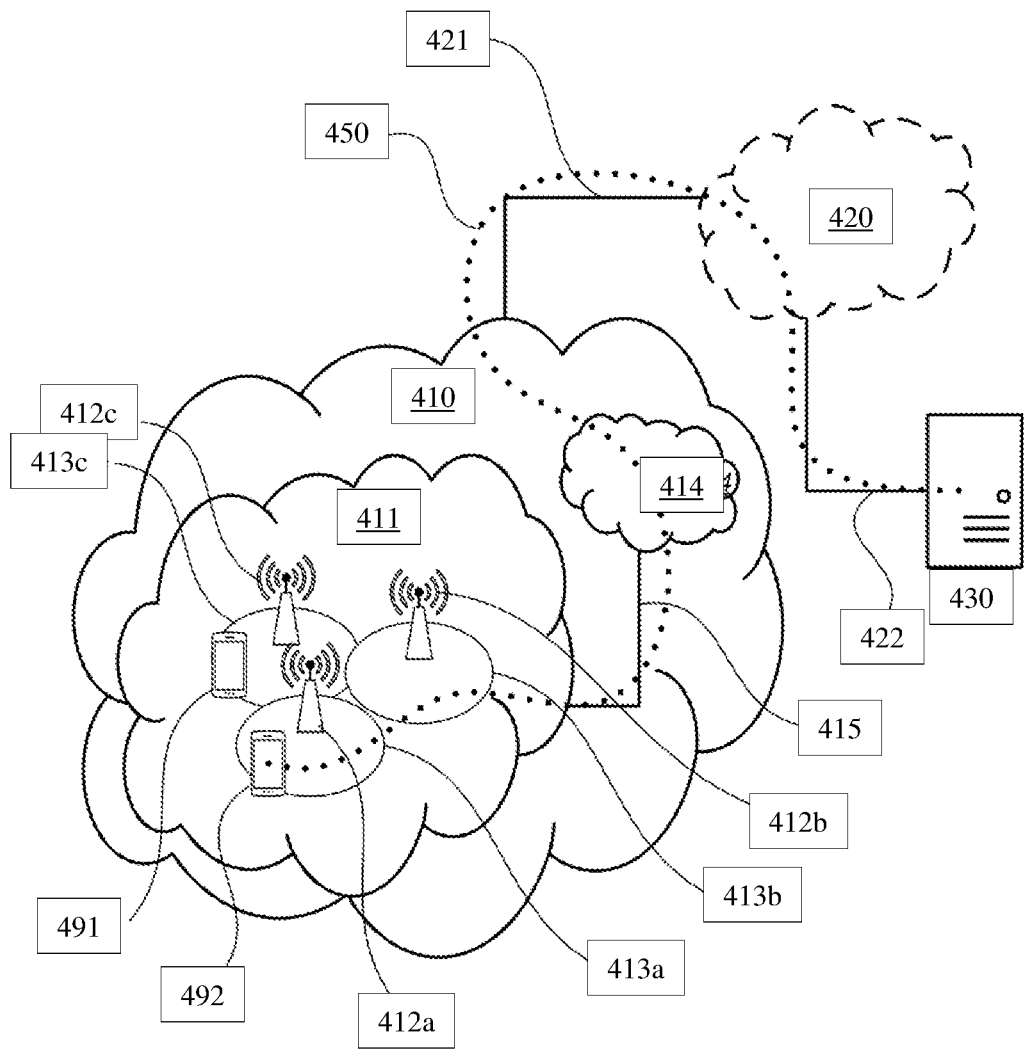
FIG. 4 illustrates a schematic view of an embodiment of a communication system including a communication network.

Turning now to FIG. 4, illustrated is a schematic view of an embodiment of a communication system including a communication network (e.g., a 3GPP-type cellular network) 410 connected to a host computer. The communication network 410 includes an access network 411, such as a radio access network, and a core network 414. The access network 411 includes a plurality of base stations 412a, 412b, 412c, such as NBs, eNBs, gNBs or other types of wireless access points, each defining a corresponding coverage area 413a, 413b, 413c. Each base station 412a, 412b, 412c is connectable to the core network 414 over a wired or wireless connection 415. A first user equipment ("UE") 491 located in coverage area 413c is configured to wirelessly connect to, or be paged by, the corresponding base station 412c. A second user equipment 492 in coverage area 413a is wirelessly connectable to the corresponding base station 412a. While a plurality of user equipment 491, 492 are illustrated in this example, the disclosed embodiments are equally applicable to a situation where a sole user equipment is in the coverage area or where a sole user equipment is connecting to the corresponding base station 412.

The communication network 410 is itself connected to the host computer 430, which may be embodied in the hardware and/or software of a standalone server, a cloud-implemented server, a distributed server or as processing resources in a server farm. The host computer 430 may be under the ownership or control of a service provider, or may be operated by the service provider or on behalf of the service provider. The connections 421, 422 between the communication network 410 and the host computer 430 may extend directly from the core network 414 to the host computer 430 or may go via an optional intermediate network 420. The intermediate network 420 may be one of, or a combination of more than one of, a public, private or hosted network; the intermediate network 420, if any, may be a backbone network or the Internet; in particular, the intermediate network 420 may include two or more sub-networks (not shown).

The communication system of FIG. 4 as a whole enables connectivity between one of the connected user equipment 491, 492 and the host computer 430. The connectivity may be described as an over-the-top ("OTT") connection 450. The host computer 430 and the connected user equipment 491, 492 are configured to communicate data and/or signaling via the OTT connection 450, using the access network 411, the core network 414, any intermediate network 420 and possible further infrastructure (not shown) as intermediaries. The OTT connection 450 may be transparent in the sense that the participating communication devices through which the OTT connection 450 passes are unaware of routing of uplink and downlink communications. For example, a base station 412 may not or need not be informed about the past routing of an incoming downlink communication with data originating from a host computer 430 to be forwarded (e.g., handed over) to a connected user equipment 491. Similarly, the base station 412 need not be aware of the future routing of an outgoing uplink communication originating from the user equipment 491 towards the host computer 430.

Figure 5:
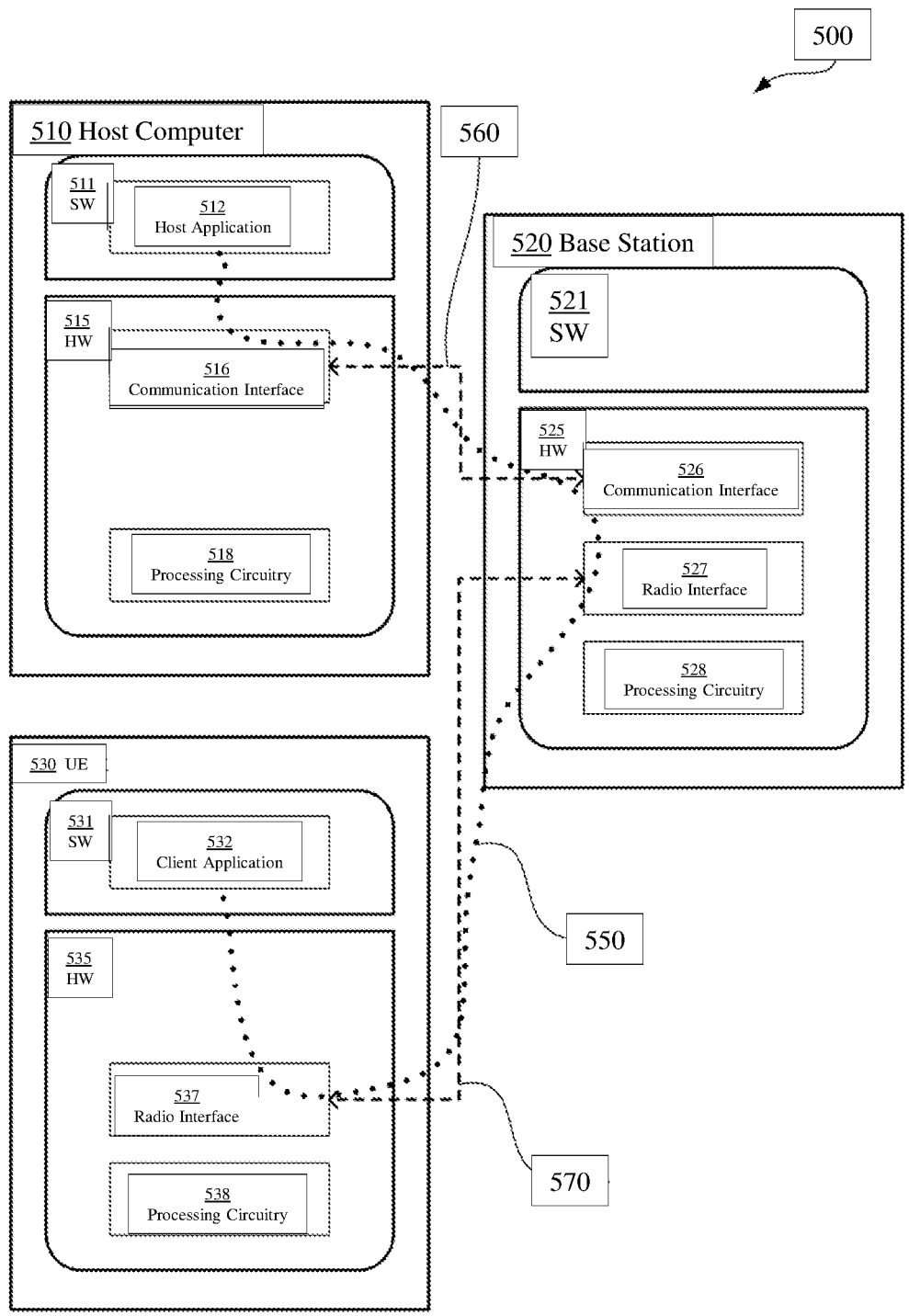
FIG. 5 illustrates a block diagram of an embodiment of a communication system.

Turning now to FIG. 5, illustrated is a block diagram of an embodiment of a communication system 500. In the communication system 500, a host computer 510 includes hardware 515 including a communication interface 516 configured to set up and maintain a wired or wireless connection with an interface of a different communication device of the communication system 500. The host computer 510 further includes processing circuitry (a processor) 518, which may have storage and/or processing capabilities. In particular, the processing circuitry 518 may include one or more programmable processors, application-specific integrated circuits, field programmable gate arrays or combinations of these (not shown) adapted to execute instructions. The host computer 510 further includes software 511, which is stored in or accessible by the host computer 510 and executable by the processing circuitry 518. The software 511 includes a host application 512. The host application 512 may be operable to provide a service to a remote user, such as a user equipment ("UE") 530 connecting via an OTT connection 550 terminating at the user equipment 530 and the host computer 510. In providing the service to the remote user, the host application 512 may provide user data which is transmitted using the OTT connection 550.

The communication system 500 further includes a base station 520 provided in a communication system and including hardware 525 enabling it to communicate with the host computer 510 and with the user equipment 530. The hardware 525 may include a communication interface 526 for setting up and maintaining a wired or wireless connection with an interface of a different communication device of the communication system 500, as well as a radio interface 527 for setting up and maintaining at least a wireless connection 570 with a user equipment 530 located in a coverage area (not shown in FIG. 5) served by the base station 520. The communication interface 526 may be configured to facilitate a connection 560 to the host computer 510. The connection 560 may be direct or it may pass through a core network (not shown in FIG. 5) of the communication system and/or through one or more intermediate networks outside the communication system. In the embodiment shown, the hardware 525 of the base station 520 further includes processing circuitry (a processor) 528, which may include one or more programmable processors, application-specific integrated circuits, field programmable gate arrays or combinations of these (not shown) adapted to execute instructions. The base station 520 further has software 521 stored internally or accessible via an external connection.

The communication system 500 further includes the user equipment 530. The user equipment 530 includes hardware 535 having a radio interface 537 configured to set up and maintain a wireless connection 570 with a base station 520 serving a coverage area in which the user equipment 530 is currently located. The hardware 535 of the user equipment 530 further includes processing circuitry (a processor) 538, which may comprise one or more programmable processors, application-specific integrated circuits, field programmable gate arrays or combinations of these (not shown) adapted to execute instructions. The user equipment 530 further includes software 531, which is stored in or accessible by the user equipment 530 and executable by the processing circuitry 538. The software 531 includes a client application 532. The client application 532 may be operable to provide a service to a human or non-human user via the user equipment 530, with the support of the host computer 510. In the host computer 510, an executing host application 512 may communicate with the executing client application 532 via the OTT connection 550 terminating at the user equipment 530 and the host computer 510. In providing the service to the user, the client application 532 may receive request data from the host application 512 and provide user data in response to the request data. The OTT connection 550 may transfer both the request data and the user data. The client application 532 may interact with the user to generate the user data that it provides.

It is noted that the host computer 510, base station 520 and user equipment 530 illustrated in FIG. 5 may be identical to the host computer 430, one of the base stations 412a, 412b, 412c and one of the user equipment 491, 492 of FIG. 4, respectively. This is to say, the inner workings of these entities may be as shown in FIG. 5 and independently, the surrounding network topology may be that of FIG. 4.

In FIG. 5, the OTT connection 550 has been drawn abstractly to illustrate the communication between the host computer 510 and the use equipment 530 via the base station 520, without explicit reference to any intermediary devices and the precise routing of messages via these devices. Network infrastructure may determine the routing, which it may be configured to hide from the user equipment 530 or from the service provider operating the host computer 510, or both. While the OTT connection 550 is active, the network infrastructure may further take decisions by which it dynamically changes the routing (e.g., on the basis of load balancing consideration or reconfiguration of the network).

A measurement procedure may be provided for the purpose of monitoring data rate, latency and other factors on which the one or more embodiments improve. There may further be an optional network functionality for reconfiguring the OTT connection 550 between the host computer 510 and user equipment 530, in response to variations in the measurement results. The measurement procedure and/or the network functionality for reconfiguring the OTT connection 550 may be implemented in the software 511 of the host computer 510 or in the software 531 of the user equipment 530, or both. In embodiments, sensors (not shown) may be deployed in or in association with communication devices through which the OTT connection 550 passes; the sensors may participate in the measurement procedure by supplying values of the monitored quantities exemplified above, or supplying values of other physical quantities from which software 511, 531 may compute or estimate the monitored quantities. The reconfiguring of the OTT connection 550 may include message format, retransmission settings, preferred routing etc.; the reconfiguring need not affect the base station 520, and it may be unknown or imperceptible to the base station 520. Such procedures and functionalities may be known and practiced in the art. In certain embodiments, measurements may involve proprietary user equipment signaling facilitating the host computer's 510 measurements of throughput, propagation times, latency and the like. The measurements may be implemented in that the software 511, 531 causes messages to be transmitted, in particular empty or 'dummy' messages, using the OTT connection 550 while it monitors propagation times, errors, etc. Additionally, the communication system 500 may employ the principles as described herein.

Figure 6:
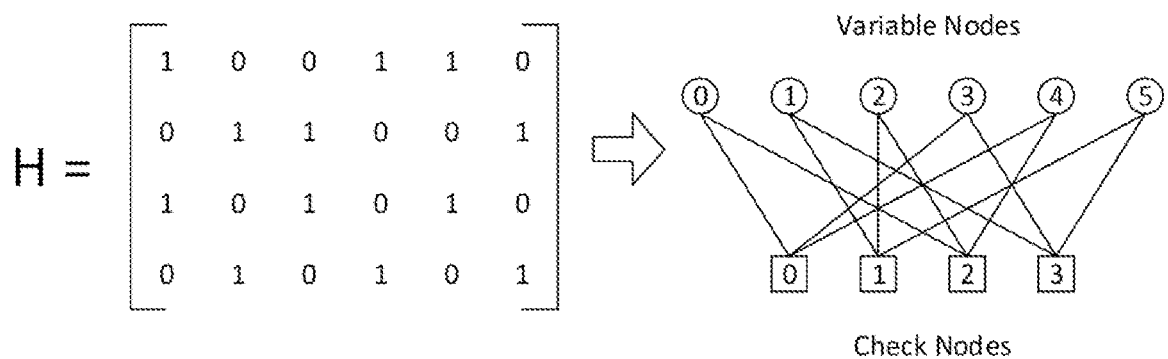
FIG. 6 illustrates an embodiment of a parity-check matrix and bipartite graph for low-density parity-check codes.

Turning now to FIG. 6, illustrated is an embodiment of a parity-check matrix ("PCM") and bipartite graph for low-density parity-check ("LDPC") codes. The LDPC codes can be described via a PCM, where the rows and columns correspond to check nodes and variable nodes, respectively. While the description herein refers to binary LDPC codes, the discussion is also applicable to non-binary LDPC codes as well. Each $h(i,j)=1$ in the PCM corresponds to an edge between a check node and a variable node. The PCM can be mapped to a bipartite graph composed of check nodes and variable nodes, where the rows and columns of the PCM correspond to check nodes and variable nodes, respectively. The code rate of the PCM may be defined as the number of information bits (or referred later as information block length) K divided by the number of coded bits N, $R=K/N$, where N is the number of columns in the PCM and K equals the number of columns minus the number of rows of the PCM.

The LDPC codes are decoded by an iterative decoder that performs a limited number of iterations. After each iteration, the decoder can calculate soft estimates of each variable node. These soft estimates can be used to generate hard estimates and, if these hard estimates correspond to a valid codeword (as can be checked through the parity check equations), the decoding can stop earlier before an upper limit of iterations is reached. If the upper limit of iterations is reached before a codeword has been found, or if the codeword that the decoder converged to was not the transmitted codeword, a decoding error has occurred. Due to the parity check equations for each codeword, the LDPC codes have inherent error detection capability.

In communication systems, the LDPC codes are often combined with a cyclic redundancy check ("CRC") code to improve the error detection capability. A CRC code is an error-detecting code commonly used to detect accidental changes to raw data. The information blocks get a short check value attached in the encoding step, based on the remainder of a polynomial division of their contents. In the decoding step, the calculation is repeated. If errors are detected, a retransmission can be requested.

The error detection capability of the CRC code depends first of all on the length of the CRC. A CRC is called an L-bit CRC when its check value is L bits long. The probability of undetected errors of an L-bit CRC may be estimated by $2^{-L}$ in many cases when the bit error rate of the CRC code is 0.5, or when the input length of the CRC encoding is large. This shows that the probability of undetected errors decreases exponentially with increasing CRC length.

In the Third Generation Partnership Program ("3GPP") Long Term Evolution ("LTE"), a scheduling unit decides which modulation and coding scheme ("MCS") that should be used for a transmission. This decision is described by an MCS index. The MCS index is mapped to a transport block size ("TBS") index through a modulation and TBS index table, for example, as shown in Table 1 for a Physical Downlink Shared Channel ("PDSCH").

TABLE 1

Modulation and TBS index table for PDSCH

| MCS Index $I_{MCS}$ | Modulation Order $Q_m$ | Modulation Order $Q'_m$ | TBS Index $I_{TBS}$ |
|---|---|---|---|
| 0 | 2 | 2 | 0 |
| 1 | 2 | 2 | 1 |
| 2 | 2 | 2 | 2 |
| 3 | 2 | 2 | 3 |
| 4 | 2 | 2 | 4 |
| 5 | 2 | 4 | 5 |
| 6 | 2 | 4 | 6 |
| 7 | 2 | 4 | 7 |
| 8 | 2 | 4 | 8 |
| 9 | 2 | 4 | 9 |
| 10 | 4 | 6 | 9 |
| 11 | 4 | 6 | 10 |
| 12 | 4 | 6 | 11 |
| 13 | 4 | 6 | 12 |
| 14 | 4 | 6 | 13 |
| 15 | 4 | 6 | 14 |
| 16 | 4 | 6 | 15 |
| 17 | 6 | 6 | 15 |
| 18 | 6 | 6 | 16 |
| 19 | 6 | 6 | 17 |
| 20 | 6 | 6 | 18 |
| 21 | 6 | 6 | 19 |
| 22 | 6 | 6 | 20 |
| 23 | 6 | 6 | 21 |
| 24 | 6 | 6 | 22 |
| 25 | 6 | 6 | 23 |
| 26 | 6 | 6 | 24 |
| 27 | 6 | 6 | 25 |
| 28 | 6 | 6 | 26/26A |
| 29 | 2 | 2 | reserved |
| 30 | 4 | 4 | |
| 31 | 6 | 6 | |

An information block size is specified through a TBS index table, for example, as shown in Table 2. For brevity, only the first 10 columns of the TBS table for a typical LTE downlink ("DL") transmission is provided, while noting that the full table contains 110 columns, with each column for a given number of physical resource blocks ("PRBs"). In this way, the MCS index and the number of PRBs together describe both coding rate, modulation scheme, and information block size of the transmission. In some cases, a transport block can be divided into different code blocks. In LTE, this happens if the TBS is larger than 6144.

TABLE 2

Transport block size table (dimension 34 × 110)

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |
| 26A | 632 | 1288 | 1928 | 2600 | 3240 | 3880 | 4584 | 5160 | 5992 | 6456 |

When the number of CRC bits is high when combined with LDPC codes, this may cause the transmission of unnecessary bits and reduces the throughput of the communication system. Thus, it would be advantageous to reduce the average number of CRC bits attached on the code block level, while still achieving the same error detection target.

In contrast to many other coding schemes, the LDPC codes have inherent error detection capability through the parity-check equations. It can be shown by simulations that the inherent error detection capability depends on both signal-to-noise ratio ("SNR"), code rate ("R") and information block length ("K"). The probability of undetected error ("$P_{UE}$") can be defined as:

$$P_{UE} = \frac{\#(\text{decoding errors not detected by parity check equations or } CRC)}{\#(\text{transmitted codewords})}.$$

Figure 7:
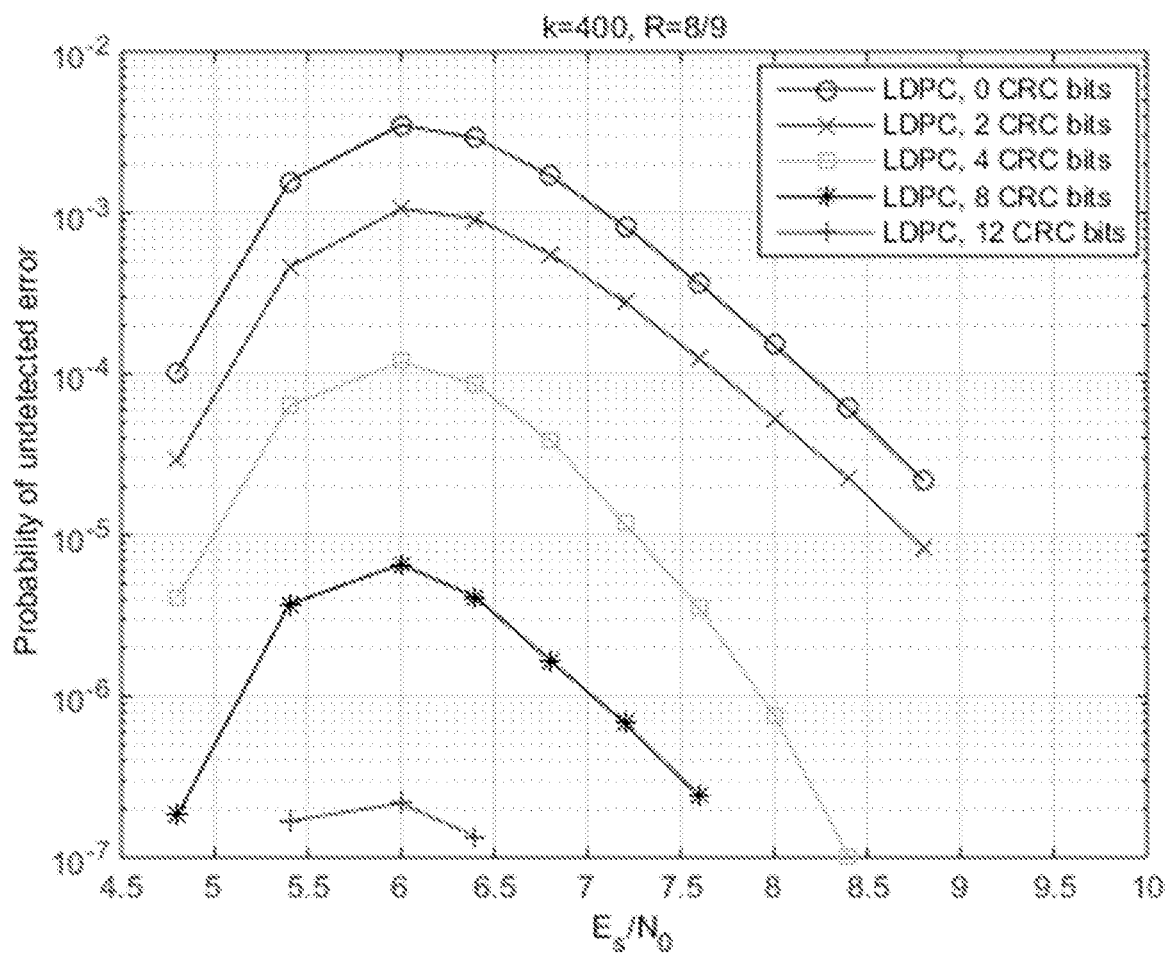
FIGS. 7 and 8 illustrated graphical representations of embodiments of probabilities of undetected errors for different LDPC codes.
Figure 8:
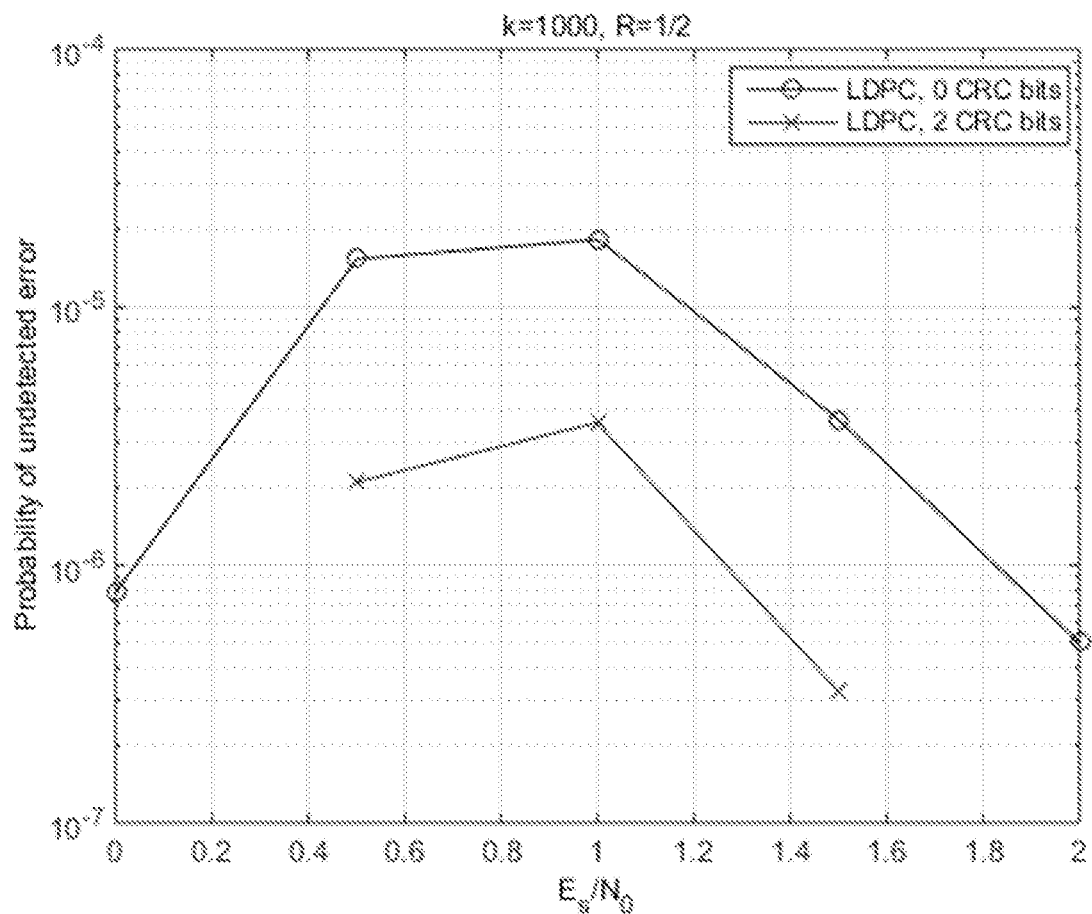

Turning now to FIGS. 7 and 8, illustrated are graphical representations of embodiments of probabilities of undetected errors for different LDPC codes. FIG. 7 demonstrates the probability of an undetected error for an LDPC code combined with a CRC code, where the LDPC code has an information block length of 400 bits and a code rate of 8/9. FIG. 8 demonstrates the probability of an undetected error for an LDPC code combined with a CRC code, where the LDPC code has an information block length of 1000 bits and a code rate of 1/2.

It can be observed that the probability of undetected error $P_{UE}$ varies significantly with the SNR, here denoted by $E_s/N_0$. By comparing the two FIGUREs, it can also be observed that the code with longer information block length and a code rate of 1/2 has a significantly lower maximum probability of undetected error $P_{UE}$ than the shorter LDPC code with a code rate 8/9. It may not be preferable to vary length of the CRC bits according to SNR, since the channel condition may vary unpredictably. On the other hand, the information block length (K) and code rate (R) are both known to the transmitter and receiver. Hence, it is possible to adapt the CRC length with the information block length (K) and code rate (R).

As described herein, the number of CRC bits attached to each LDPC code block may be dependent on the information block length (K) and/or the code rate (R) of the LDPC code. The number of CRC bits to use for each specific combination of information block length (K) and code rate (R) may be determined through simulations, since it is dependent on the specific LDPC code. For a large information block length (K), the probability of undetected error $P_{UE}$ is very low and may be difficult to assess through simulations. In this case, bounds and models of the error detection capability may be used to estimate the number of CRC bits needed to achieve a certain probability of undetected error $P_{UE}$ target on code block level.

We assume, as an example, that the CRC bits are attached at the code block level. For short transport blocks wherein code block segmentation is not performed, one CRC is attached. In this case, the attachment of the CRC bits on code block level or transport block level is the same thing. By specifying the number of CRC bits for each possible combination of information block length (K) and code rate (R), the number of CRC bits for a given combination will be known by the receiver without additional signaling. When specifying the number of CRC bits to attach, the code rate (R) is defined as:

$$R = \frac{K}{N} = \frac{\#\text{information bits excluding } CRC \text{ bits}}{\#\text{codeword bits}}.$$

Since the number of possible combinations can be large, ranges of information block length (K) and code rate (R) can be treated together.

In the LTE, for a transport block mapped to a given number (M) of multiple input, multiple output ("MIMO") layers, the code rate, modulation, and transport block size ("TBS") are specified through a MCS index and the number of PRBs used for the transmission, as described above. The number of CRC bits to attach to each code block may be allocated in a table similar to the TBS index table, but showing the number of CRC bits to attach instead of the transport block size. An example of the number of CRC bits to attach for some of the combinations is shown in Table 3, when the transport block ("TB") is mapped to a single MIMO layer.

TABLE 3

Number of CRC bits as a function of TBS index and number of PRBs, when the TB is mapped to a single MIMO layer

| $I_{TBS}$ | $N_{PRB}$ | | | | | | | | | |
|---|---|---|---|---|---|---|---|---|---|---|
|  | 1 | 2 | 3 | 4 | 5 | 6 | 7 | 8 | 9 | 10 |
| 0 | 16 | 16 | 16 | 16 | 12 | 12 | 12 | 12 | 8 | 8 |
| 1 | 16 | 16 | 16 | 12 | 12 | 12 | 12 | 8 | 8 | 8 |
| 2 | 16 | 16 | 12 | 12 | 12 | 12 | 8 | 8 | 8 | 8 |
| 3 | 16 | 12 | 12 | 12 | 12 | 8 | 8 | 8 | 8 | 4 |
| 4 | 16 | 16 | 12 | ... | | | | | | ... |
| 5 | 16 | 16 | 12 | | | | | | | |
| 6 | ... | ... | | | | | | | | |
| 7 | | | | | | | | | | |
| 8 | | | | | | | | | | |
| 9 | | | | | | | | | | |
| 10 | | | | | | | | | | |
| 11 | | | | | | | | | | |
| 12 | | | | | | | | | | |
| 13 | | | | | | | | | | |
| 14 | | | | | X | | | | | |
| 15 | | | | | | | | | | |
| 16 | | | | | | | | | | |
| 17 | | | | | | | | | | |
| 18 | | | | | | | | | | |
| 19 | | | | | | | | | | |
| 20 | | | | | | | | | | |
| 21 | | | | | | | | | | |
| 22 | | | | | | | | | | |
| 23 | | | | | | | | | | |
| 24 | | | | | | | | | | |
| 25 | | | | | | | | | | |
| 26 | | | | | | | | | | |
| 26A | | | | | | | | | | |

At some point, for example, where the X is shown in Table 3, the combination of TBS index and number of PRBs corresponds to a transport block size that is too large to be transmitted with a single codeword. In this case, code block segmentation is performed and a CRC should be attached to each of the corresponding code blocks. Entries in the table corresponding to transport block sizes that employ code block segmentation is set forth below. A first option is a single entry corresponding to the number of CRC bits that should be attached to each of the corresponding code blocks. Another option is a list for as many entries as there are code blocks. Each entry corresponds to the number of CRC bits that should be attached to the corresponding code block. This alternative may be advantageous if the transport block is segmented into code blocks of different length. Yet another option is a list for as many entries as the number of different code block sizes. Each entry corresponds to the number of CRC bits that should be attached to a code block of the corresponding code block size. This alternative may be advantageous if the transport block is segmented into code blocks of different length.

The number of CRC bits (L) may also be described in table similar to the TBS table shown in Table 2 above. In this example, the number of CRC bits is decreasing with increasing information block length (K). Through simulations, the LDPC codes with medium code rates have better inherent error detection capability than LDPC codes with very high or very low code rates. This is accounted for in Table 4 as well.

TABLE 4

Number of CRC bits (L) as a function of code rate (R) and information block length (K)

| | $R < 0.2$ | $0.2 \leq R < 0.4$ | $0.4 \leq R < 0.6$ | $0.6 \leq R < 0.8$ | $0.8 \leq R < 1$ |
|---|---|---|---|---|---|
| $K < 400$ | L = 16 | L = 16 | L = 12 | L = 12 | L = 16 |
| $400 \leq K < 1000$ | L = 12 | L = 12 | L = 8 | L = 8 | L = 12 |
| $1000 \leq K < 2000$ | L = 8 | L = 8 | L = 4 | L = 4 | L = 8 |
| $2000 \leq K < 4000$ | L = 4 | L = 4 | L = 2 | L = 2 | L = 4 |
| $4000 \leq K$ | L = 2 | L = 2 | L = 0 | L = 0 | L = 2 |

In another embodiment, the number of CRC bits to attach to a code block before LDPC encoding is a function of, for instance, transport block size only. Let Z be the maximum code block size of LDPC encoding. The entire transport block is used to calculate the TB-level CRC parity bits. Denote the bits in a transport block delivered to layer 1 by $a_0, a_1, a_2, a_3, \ldots, a_{A-1}$, and the parity bits by $p_0, p_1, p_2, p_3, \ldots, p_{L_{TB}-1}$. The size of the transport block is "A" and $L_{TB}$ is the number of parity bits. The number of parity bits $L_{TB}$ is determined according to TB size "A" before CRC attachment. As an example, the following procedure is used employing two TBS thresholds to obtain three different number of parity bit $L_{TB}$ values. The two thresholds as set forth in Table 5 are denoted below as $K_{threshold,1}$ and $K_{threshold,2}$, with $K_{threshold,1} < K_{threshold,2}$.

TABLE 5

If $A <= K_{threshold,1}$
$L_{TB} = L_{TB,1}$;
Else if $A <= K_{threshold,2}$
$L_{TB} = L_{TB,2}$;
Else
$L_{TB} = L_{TB,3}$;
End A similar principle can be used to determine a different number of parity bit $L_{TB}$ values.

Typically, the highest threshold is a function of maximum code block size of LDPC coding. In one example, $K_{threshold,2} = Z - L_2$, so that TB-level CRC bits are attached when there is only one code block when $A <= K_{threshold,2}$. The transport block after TB-level CRC attachment, which is the input bit sequence to the code block segmentation procedure, is denoted by $b_0, b_1, b_2, b_3, \ldots, b_{B-1}$, where $B = A + L_{TB}$, $B > 0$. If the transport block B is larger than the maximum code block size Z, segmentation of the input bit sequence is performed and an additional CRC sequence of $L_{CB}$ bits is attached to each code block.

The total number of code blocks C may be determined as set forth in Table 6.

TABLE 6 if $B \leq Z$
  $L_{CB} = 0$
  Number of code blocks: $C = 1$
  $B' = B$
else
  $L_{CB} = L_{CB,1}$
  Number of code blocks: $C = \lceil B/(Z - L) \rceil$
  $B' = B + C * L$
end if As an example, the following parameter values can be used as set forth in Table 7.

TABLE 7

Maximum code block size $Z = 8192$
3 different TB-level CRC size:
  LTB, 1 = 16;
  LTB, 2 = 8;
  LTB, 3 = 4;
A single CB-level CRC size
  LCB, 1 = 4;

To achieve a lower probability of undetected error $P_{UE}$ target, a fixed number of CRC bits may be added to the number of CRC bits specified for each combination of information block length (K) and code rate (R). For example, it may be important to avoid undetected errors for Ultra-Reliable and Low-Latency Communications ("URLLC"). A fixed number of CRC bits, e.g., 4 or 8, can then be added to the number of CRC bits specified. The fixed number of additional CRC bits may be signaled over higher layers or be specified in advance for certain applications or situations.

Figure 9:
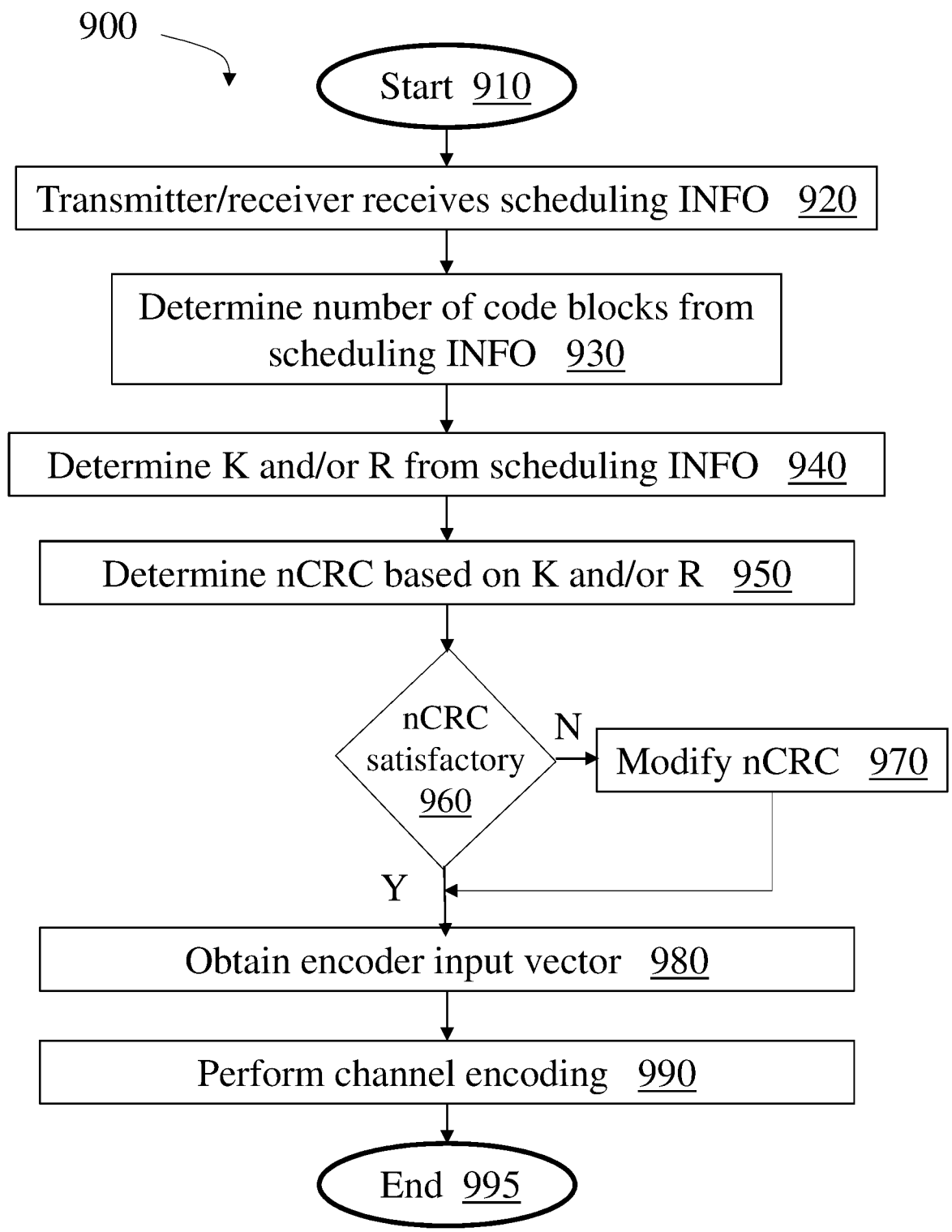
FIGS. 9 and 10 illustrate flow diagrams of embodiments of methods of operating a communication system.

Turning now to FIG. 9, illustrated is a flow diagram of an embodiment of a method 900 of operating a communication system. The method 900 is operable on a communication node (such as the user equipment 110, 200 and/or radio access node 120, 300 introduced with respect to FIGS. 1 to 3) in the communication system (such as the communication system 100 introduced with respect to FIG. 1). The method 900 begins at a step or module 910. A transmitter/receiver receives scheduling information from the communication system at a step or module 920. The scheduling information for the user equipment ("UE") as a transmitter may be an uplink grant, a semi-persistent scheduling grant, or information from a scheduling unit in the UE such as a sidelink. The scheduling information for the UE as receiver may be downlink control information ("DCI"), either one-stage or two stage (that is, the total downlink control information may be a combination of several downlink control information), or control information relating to sidelink communication. The scheduling information for a base station (e.g., eNB or gNB) as a transmitter or receiver may be from a scheduling unit in the base station or centralized scheduling unit.

The system then determines the number of code blocks (including a sequence of data bits) from the scheduling information at a step or module 930 and an information block length (K) and/or code rate (R) for each code block at a step or module 940. It should be understood that a plurality of code blocks may form a transport block. If there is a single code block, however, the code block and transport block are synonymous. The information block length (K) and/or code rate (R) of the code block may be specified through a modulation and coding scheme ("MCS") index, a number of physical resource blocks ("PRBs"), and a number of multiple input multiple output (MIMO) layers used for transmission of the transport block. The information block length (K) is dependent on a size of the transport block.

At a step or module 950, the system determines the number of CRC bits ("nCRC") as a function of the information block length (K) and/or code rate (R) for each code block. The number of CRC bits tends to decrease with an increase of the information block length (K), and increase with an increase of the code rate (R). The number of CRC bits may be specified in a table with respect to the information block length (K) and/or code rate (R). The table may be formed with one or more of the indices associated with the scheduling information such as an index associated with the MCS), an index associated with a number of scheduled PRBs, and an index associated with a number of MIMO layers carried in the scheduling information.

As further examples, the number of CRC bits may be determined by comparing the information block length (K) with one or more predefined thresholds. The information block length (K) may depend on a size of a transport block, and the number of CRC bits is determined by comparing the size of the transport block with one or more predefined thresholds. The number of CRC bits may be determined by comparing the code rate (R) with one or more predefined thresholds. The code rate (R) may depend on a target code rate mapped to a MCS index, and the number of CRC bits is determined by comparing the MCS index with one or more predefined thresholds.

At a decisional step or module 960, the system determines if the number of CRC bits is satisfactory to, for instance, lower the probability of undetected errors. If the number of CRC bits is not satisfactory, the system modifies the number of CRC bits at a step or module 970 and transitions to a step or module 980, otherwise the method 900 transitions directly to the step or module 980. The modification of the number of CRC bits may be for each combination of the information block length (K) and/or said code rate (R) by a fixed number when the combination reaches a threshold. The system then obtains an encoder input vector by attaching a vector of the number of the CRC bits to the code block at the step or module 980 and performs channel encoding for the encoder input vector at a step or module 990. The vector is a function of the sequence of data bits of the code block. The method 900 ends at a step or module 995.

Figure 10:
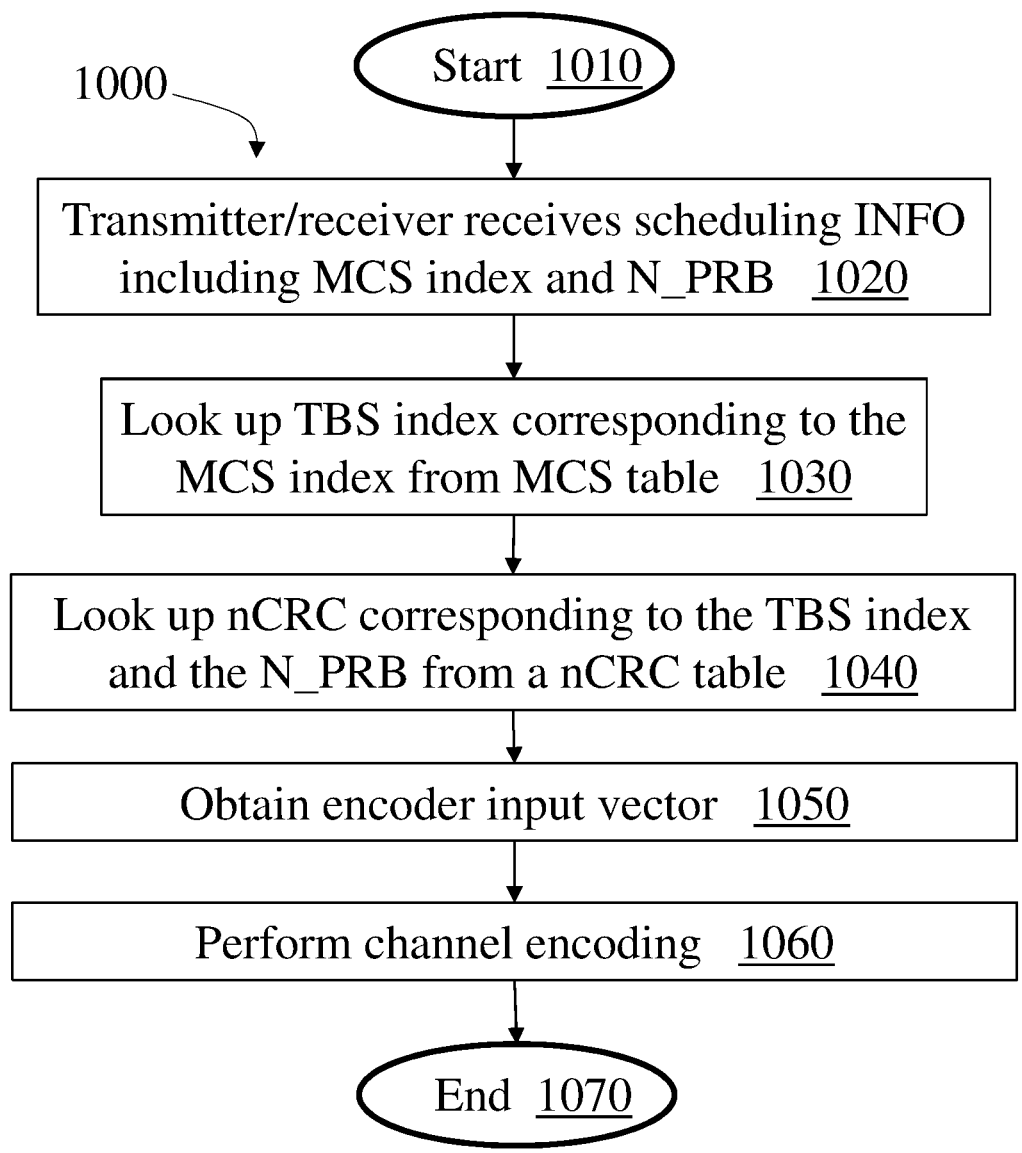

Turning now to FIG. 10, illustrated is a flow diagram of an embodiment of a method 1000 of operating a communication system. The method 1000 is operable on a communication node (such as the user equipment 110, 200 and/or radio access node 120, 300 introduced with respect to FIGS. 1 to 3) in the communication system (such as the communication system 100 introduced with respect to FIG. 1). The method 1000 begins at a step or module 1010. A transmitter/receiver receives scheduling information including an MCS index and number of physical resource blocks ("N_PRB") at a step or module 1020. The scheduling information for the user equipment ("UE") as a transmitter may be an uplink grant, a semi-persistent scheduling grant, or information from a scheduling unit in the UE such as a sidelink. The scheduling information for the UE as receiver may be downlink control information ("DCI"), either one-stage or two stage (that is, the total downlink control information may be a combination of several downlink control information), or control information relating to sidelink communication. The scheduling information for a base station (e.g., eNB or gNB) as a transmitter or receiver may be from a scheduling unit in the base station or centralized scheduling unit.

The system then looks up a TBS index corresponding to the MCS index from a MCS table at a step or module 1030. At a step or module 1040, the system looks up the number of CRC bits ("nCRC") corresponding to the TBS index and the N_PRB from a nCRC table. The system then obtains an encoder input vector by attaching a vector of the number of the CRC bits to the code block at a step or module 1050 and performs channel encoding for the encoder input vector at a step or module 1060. The method 1000 ends at a step or module 1070.

Thus, instead of having a fixed number of CRC bits attached to every code block, the system and method selects the number of CRC bits to vary with information block length (K) and/or code rate (R). To that end, the system may specify the number of CRC bits to use for each specific combination of information block length (K) and code rate (R). The number of CRC bits to use for specific combinations of information block length (K) and code rate (R) may also be specified for different combinations of ranges thereof. The number of CRC bits may be specified in a table similar to a transport block size table with one index associated with the modulation order and code rate, and another index associated with the number of smallest schedulable units.

In an embodiment, the number of CRC bits is non-increasing with increasing information block length (K). There may be several different tables describing the number of CRC bits to attach, where higher layer signaling is used to clarify which table that should be used. For example, the URLLC may use one table and the enhanced mobile broadband ("eMBB") another table. The system may signal the number of CRC bits to attach in the control information for each transmission. Thus, the number of CRC bits attached on code block level varies with information block length (K) and/or code rate (R). By specifying the number of CRC bits for each combination of MCS index and TBS index or for ranges of the information block length (K) and/or code rate (R), additional signaling of the number of CRC bits may be avoided.

Thus, a system and method for selecting a number of cyclic redundancy check bits in a communication system (100) has been introduced herein. In one embodiment, an apparatus (110, 200, 120, 300 including processing circuitry 210, 310) operating in the communication system (100) is configured to receive scheduling information from the communication system (100), and determine an information block length (K) and/or code rate (R) for a code block including a sequence of data bits from the scheduling information. The apparatus (110, 200, 120, 300) is further configured to determine a number of cyclic redundancy check (CRC) bits as a function of the information block length (K) and/or code rate (R) for the code block.

The number of CRC bits tends to decrease with an increase of said information block length (K), and increase with an increase of the code rate (R). The number of CRC bits may be specified in a table. The table may be formed with one or more of the following indices associated with the scheduling information such as an index associated with a modulation and coding scheme ("MCS"), an index associated with a number of scheduled physical resource blocks ("PRBs"), and an index associated with a number of multiple input multiple output ("MIMO") layers carried in the scheduling information.

The apparatus (110, 200, 120, 300) may determine the number of CRC bits in accordance with comparing the information block length (K) and/or code rate (R) with one or more predefined thresholds. The information block length (K) may depend on a size of a transport block, and the apparatus (110, 200, 120, 300) is configured to determine the number of CRC bits in accordance with comparing the size of the transport block with one or more predefined thresholds. The code rate (R) may depend on a target code rate mapped to a MCS index, and the apparatus (110, 200, 120, 300) is configured determine the number of CRC bits in accordance with comparing the MCS index with one or more predefined thresholds. The apparatus (110, 200, 120, 300) is further configured to modify the number of CRC bits specified for each combination of the information block length (K) and/or the code rate (R) by, for instance, a fixed number when the combination reaches a threshold.

The apparatus (110, 200, 120, 300) is further configured to obtain an encoder input vector by attaching a vector of the number of the CRC bits to the code block, and perform channel encoding for the encoder input vector. The vector of the number of CRC bits may be obtained as a function of the sequence of data bits of the code block.

The scheduling information can be provided for a transport block, and the code block forms a full transport block. The information block length (K) is dependent on a size of the transport block. The transport block is segmented into a plurality of code blocks, and the apparatus (110, 200, 120,

300) is configured to determine the number of CRC bits as a function of the information block length (K) and/or code rate (R) for each code block of the plurality of code blocks. The information block length (K) and/or code rate (R) of the code block may be specified through a MCS index, a number of PRBs, and a number of MIMO layers used for transmission of the transport block.

As described above, the exemplary embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

The invention claimed is:

1. An apparatus operating in a communication system, comprising:
processing circuitry configured to:
receive scheduling information from said communication system;
determine an information block length (K) and/or code rate (R) for a code block including a sequence of data bits from said scheduling information; and
determine a number of cyclic redundancy check (CRC) bits as a function of said information block length (K) and/or said code rate (R) for said code block, wherein said number of CRC bits decreases with an increase of said information block length (K), and said number of CRC bits increases with an increase of said code rate (R), and wherein the number of CRC bits is specified with a first index associated with a modulation order and code rate, and a second index associated with a number of smallest schedulable units.

2. The apparatus as recited in claim 1, wherein said processing circuity is further configured to:
obtain an encoder input vector by attaching a vector of said number of said CRC bits to said code block; and
perform channel encoding for said encoder input vector.

3. The apparatus as recited in claim 1, wherein a transport block is segmented into a plurality of code blocks, said processing circuity being configured to determine said number of CRC bits as a function of said information block length (K) and/or said code rate (R) for each code block of said plurality of code blocks.

4. The apparatus as recited in claim 1, wherein said information block length (K) and/or said code rate (R) of said code block are specified through a modulation and coding scheme (MCS) index, a number of physical resource blocks (PRBs), and a number of multiple input multiple output (MIMO) layers used for transmission of a transport block.

5. The apparatus as recited in claim 1, wherein said processing circuity is further configured to modify said number of CRC bits specified for each combination of said information block length (K) and/or said code rate (R) by a fixed number when said combination reaches a threshold.

6. The apparatus as recited in claim 1, wherein a table is formed with one or more of the following indices associated with said scheduling information:
an index associated with a modulation and coding scheme (MCS),
an index associated with a number of scheduled physical resource blocks (PRBs), and
an index associated with a number of multiple input multiple output (MIMO) layers carried in said scheduling information.

7. The apparatus as recited in claim 1, wherein said processing circuitry is configured to determine said number of CRC bits in accordance with comparing said information block length (K) with one or more predefined thresholds, or comparing said code rate (R) with one or more predefined thresholds.

8. The apparatus as recited in claim 1, wherein said information block length (K) is dependent on a size of a transport block, and said processing circuitry is configured to determine said number of CRC bits in accordance with comparing said size of said transport block with one or more predefined thresholds.

9. The apparatus as recited in claim 1, wherein said code rate (R) is dependent on a target code rate mapped to a modulation and coding scheme (MCS) index, and said processing circuitry is configured to determine said number of CRC bits in accordance with comparing said MCS index with one or more predefined thresholds.

10. A method of operating a communication node in a communication system, comprising:
receiving scheduling information from said communication system;

determining an information block length (K) and/or code rate (R) for a code block including a sequence of data bits from said scheduling information; and determining a number of cyclic redundancy check (CRC) bits as a function of said information block length (K) and/or said code rate (R) for said code block, wherein said number of CRC bits decreases with an increase of said information block length (K), and said number of CRC bits increases with an increase of said code rate (R), and wherein the number of CRC bits is specified with a first index associated with a modulation order and code rate, and a second index associated with a number of smallest schedulable units.

11. The method as recited in claim 10, further comprising:
obtaining an encoder input vector by attaching a vector of said number of said CRC bits to said code block; and
performing channel encoding for said encoder input vector.

12. The method as recited in claim 10, wherein a transport block is segmented into a plurality of code blocks, said determining said number of CRC bits being a function of said information block length (K) and/or said code rate (R) for each code block of said plurality of code blocks.

13. The method as recited in claim 10, wherein said information block length (K) and/or said code rate (R) of said code block are specified through a modulation and coding scheme (MCS) index, a number of physical resource blocks (PRBs), and a number of multiple input multiple output (MIMO) layers used for transmission of a transport block.

14. The method as recited in claim 10, further comprising modifying said number of CRC bits specified for each combination of said information block length (K) and/or said code rate (R) by a fixed number when said combination reaches a threshold.

15. The method as recited in claim 10, wherein a table is formed with one or more of the following indices associated with said scheduling information:
an index associated with a modulation and coding scheme (MCS),
an index associated with a number of scheduled physical resource blocks (PRBs), and
an index associated with a number of multiple input multiple output (MIMO) layers carried in said scheduling information.

16. The method as recited in claim 10, wherein said determining said number of CRC bits comprises comparing said information block length (K) with one or more predefined thresholds, or comparing said code rate (R) with one or more predefined thresholds.

17. The method as recited in claim 10, wherein said information block length (K) is dependent on a size of a transport block, and said determining said number of CRC bits comprises comparing said size of said transport block with one or more predefined thresholds.

18. The method as recited in claim 10, wherein said code rate (R) is dependent on a target code rate mapped to a modulation and coding scheme (MCS) index, and said determining said number of CRC bits comprises comparing said MCS index with one or more predefined thresholds.

* * * * *